Patented Nov. 7, 1933

1,933,822

UNITED STATES PATENT OFFICE 1,933,822

CELLULOSE ACETATE COMPOSITIONS CONTAINING BIPHENYL BENZOATE

Thomas F. Murray, Jr., and Cyril J. Staud, Rochester, N. Y., assignors to Eastman Kodak Company, Rochester, N. Y., a corporation of New York No Drawing. Application July 29, 1932
Serial No. 626,219

5 Claims. (Cl. 106—40)

This invention relates to the manufacture of cellulose organic ester sheets. An object of our invention is to provide cellulose ester sheets having a crystalline or nacreous appearance, such as are useful in the manufacture of toilet articles, novelties, etc. Other objects will hereinafter appear.

In order to produce crystalline effects in cellulose ester sheets, a substance is introduced into the cellulose ester solution from which the sheets are to be cast, which substance is of low solubility in the cellulose ester solvent used in making the solution. As the solvent evaporates, the substance crystallizes out in the sheet. The crystal form is characteristic of the substance used as crystallizing agent. In order to give a beautiful effect, the crystal form should be well defined, and the crystals should impart a soft sheen to the cellulose ester sheet. While flexibility such as is required in motion picture film is not necessary in these decorative sheets, the crystallizing agent should not be a substance which causes actual brittleness of the sheet.

We have discovered that para-biphenyl benzoate is a satisfactory crystallizing agent for use in cellulose acetate and other organic ester sheets, and that it imparts a very beautiful appearance to such sheets. Para-biphenyl benzoate has been described in the literature, and has the structural formula

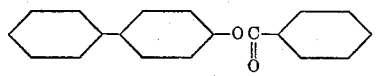

In order that those skilled in this art may better understand our invention, we would state, by way of illustration, that for the manufacture of sheets, our new composition of matter may be compounded as follows: 100 parts of acetone-soluble cellulose acetate, i. e. cellulose acetate containing from 36% to 42% acetyl radical, approximately, is dissolved with stirring at atmospheric temperature in 300 to 500 parts, preferably 400 parts, by weight, of acetone. To this solution is added approximately 10 parts by weight of p-biphenyl benzoate. The amount of p-biphenyl benzoate may be increased or decreased somewhat, but we have found that 10 parts gives the most beautiful effect, without bringing about actual brittleness of the sheets made from the composition. The amount of solvent employed may also be increased or decreased, depending upon whether it is desired to have a more or less freely flowing composition, respectively. A composition of matter prepared as described may be deposited upon any suitable film-forming surface to form films or sheets, in a manner well known to those skilled in the art.

Other solvents (instead of acetone) which are compatible with the cellulose acetate and in which p-biphenyl benzoate has only a limited solubility may also occur to those skilled in this art. In like manner this crystallizing agent may be compounded with other single organic esters of cellulose, such as cellulose propionate, butyrate and the like, or with mixed organic esters, such as cellulose aceto-stearate, cellulose aceto-propionate, or cellulose aceto-malate, a suitable solvent which will dissolve the cellulose ester and in which the p-biphenyl benzoate shows only a limited solubility being employed.

What we claim and desire to be secured by Letters Patent of the United States is:

1. A composition of matter comprising a cellulose organic ester and p-biphenyl benzoate.
2. A composition of matter comprising cellulose acetate and p-biphenyl benzoate.
3. A cellulose organic ester sheet comprising crystallized p-biphenyl benzoate.
4. A cellulose acetate sheet comprising crystallized p-biphenyl benzoate.
5. A composition of matter comprising 100 parts by weight of cellulose acetate and approximately 10 parts by weight of p-biphenyl benzoate.

THOMAS F. MURRAY, Jr.
CYRIL J. STAUD.